Patented Jan. 13, 1942

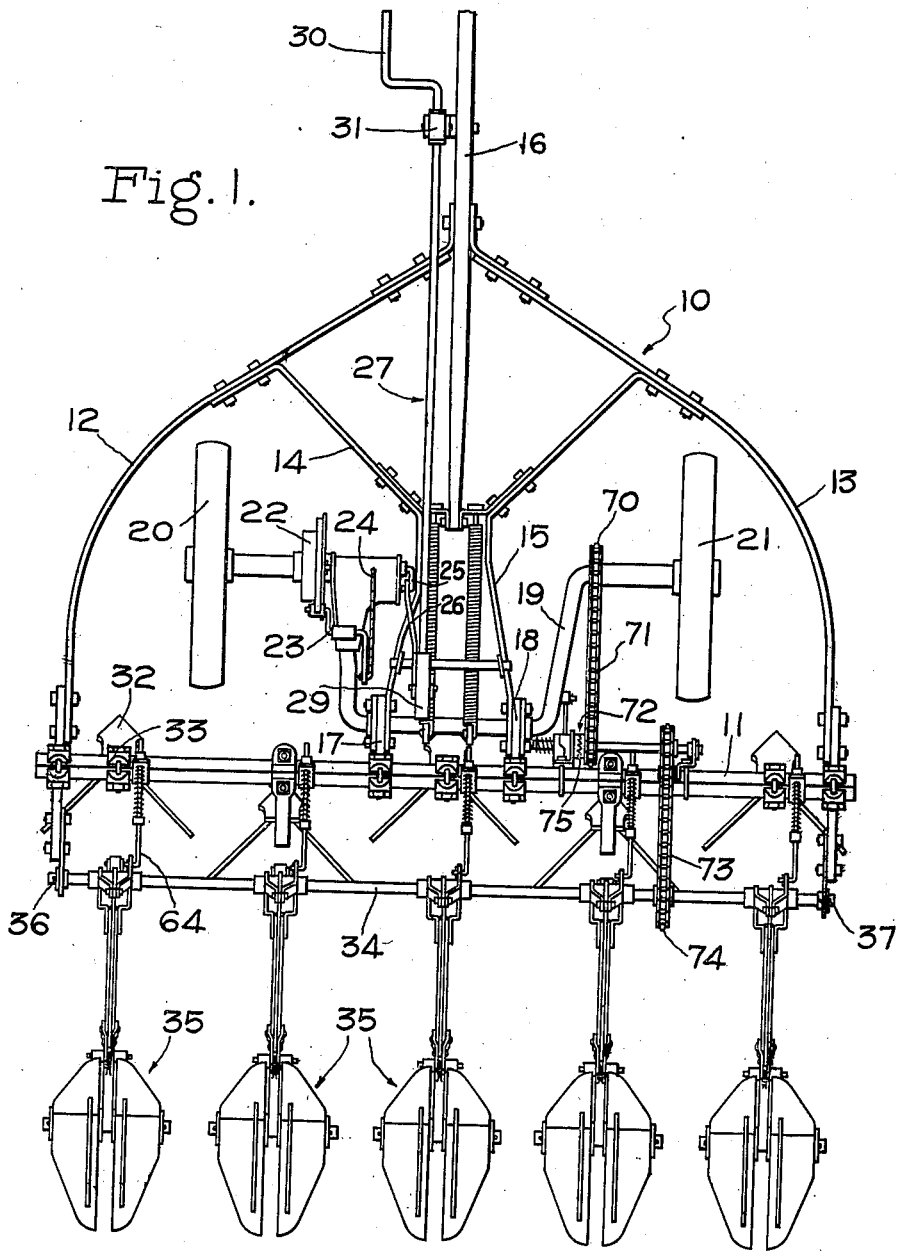

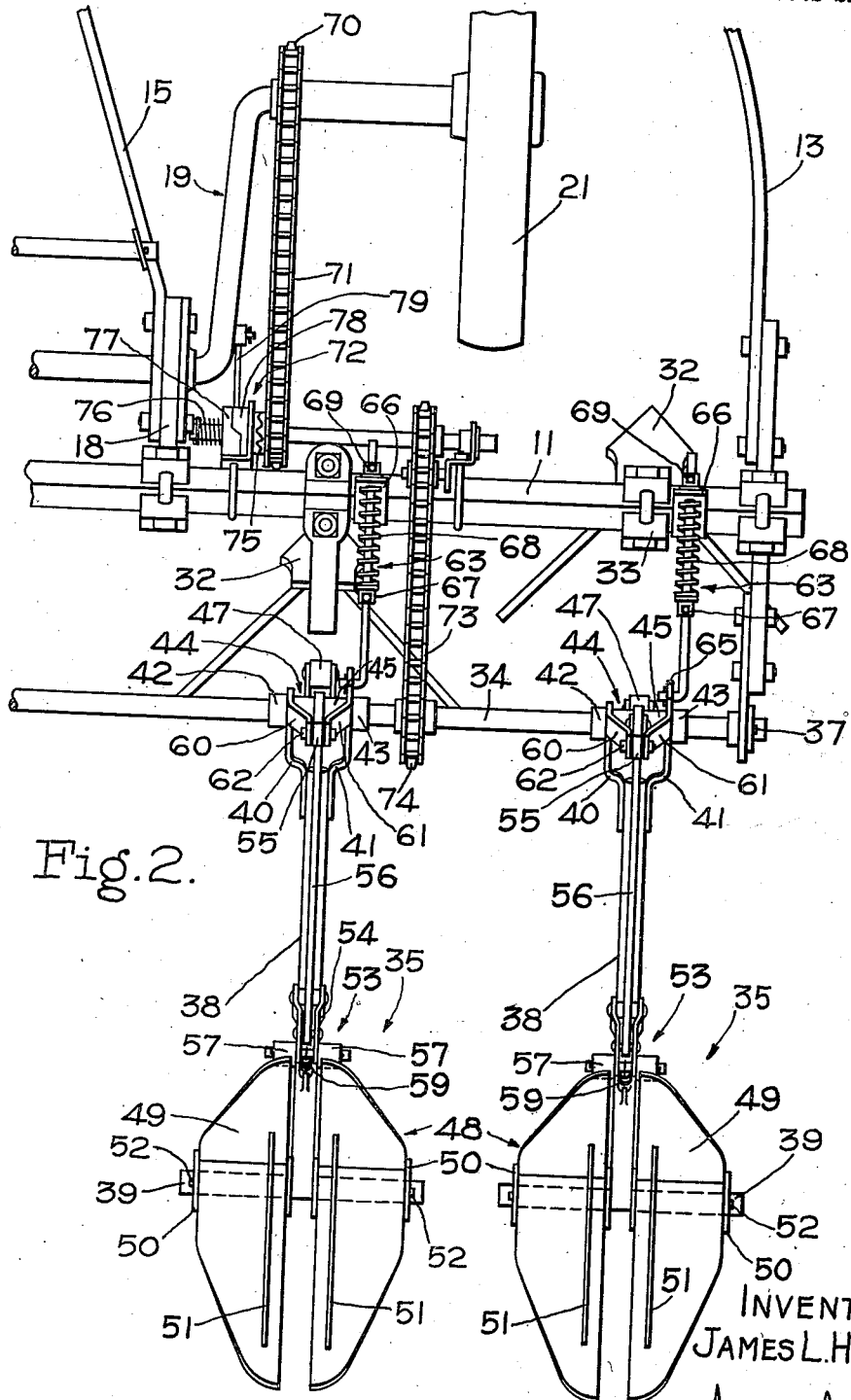

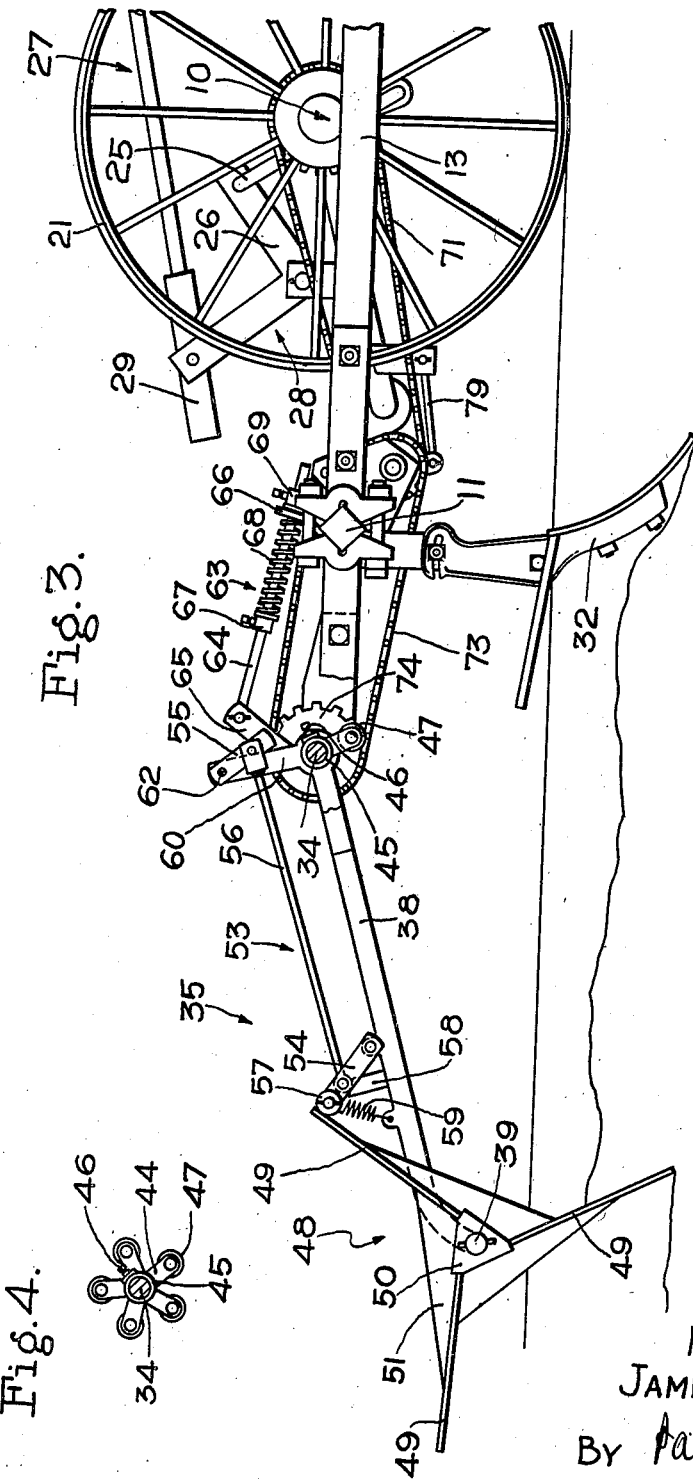

2,269,974

UNITED STATES PATENT OFFICE 2,269,974

ROLL-OVER TYPE DAMMER

James L. Hipple, Canton, Ill., assignor to International Harvester Company, a corporation of New Jersey Application June 1, 1939, Serial No. 276,850

17 Claims. (Cl. 97—55)

This invention relates to a roll-over type dammer attachment particularly adaptable for use in a summer fallowing machine wherein the damming attachments are arranged to be close together in rear of tools carried on a transversely extending frame.

The object of this invention is to provide in such an attachment an arrangement whereby the drag link carrying the roll-over damming tool is adapted to pivot about the same center on which the cam for operating the tripping mechanism rotates.

It is another object of the invention to provide a single rotatable shaft which carries the damming attachments and which is rotatable to effect driving of the cams for operating the tripping mechanisms of the respective damming attachments in a predetermined sequence depending upon the angular relationship of the respective cams on the rotatable shaft.

It is another object of the invention to provide in that portion of the damming attachments which are connected to the rotatable shaft means which is so fashioned at its point of connection to the shaft and with respect to the cam as to have its position along the shaft determined and fixed by the positioning of the cam along the same.

It is another object of the invention to provide biasing means adapted to act on the damming attachments and which are slidable transversely on a transverse tool bar in order to provide means for alinement of the biasing means upon lateral adjustment of the damming attachment.

It is still another object of the invention to provide an improved type of blade construction for roll-over type dammers.

For other objects and for a better understanding of the invention, reference may be had to the following description taken in connection with the accompanying drawings, in which:

Figure 1 is a plan view of the tool-carrying frame and of the damming attachments extending rearwardly therefrom;

Figure 2 is an enlarged plan view of a portion of the machine showing only two of the dammer attachments;

Figure 3 is a view in elevation of that portion of the machine and attachments as shown in Figure 2; and, Figure 4 is a detail view in elevation showing the rotatable shaft and the cams thereon for the respective dammer attachments, being in angularly spaced relationship.

Referring now to the figures, there is shown in general a supporting frame 10 including a transversely extending tool bar 11 carried by longitudinally extending frame members 12 and 13 and by inner brace members 14 and 15. Extending forwardly and connected to the longitudinal members is a tongue portion 16 for attachment to a tractor. The bracing portions 14 and 15 are fixed to the transverse tool bar 11 by clamping members 17 and 18. Both of these have pivotally attached thereto a double crank axle 19 having wheels 20 and 21 thereon and forming ground means for supporting the frame 10. This ground supporting means has associated therewith a power lifting mechanism 22 adapted to be operated by the wheel 20 and put in operation by the rotation of a control means 23 adapted to be operated by a pull rope 24 which may be accessible to the operator on the tractor. This power lifting mechanism is of the usual form and is adapted to operate through a crank 25 and a link 26 which is in turn connected to a manual adjusting mechanism 27 of the screw type which includes a bell crank 28 pivoted on the frame 10 and having a threaded sleeve portion 29 into which is threaded for operation a hand crank 30 fixed for rotation at a forward point in a clevis arrangement 31 on the tongue portion 16 of the frame 10. The operation of the crank handle 30, which may be accessible to the operator on a tractor, serves to effect the depth adjustment of digging tools 32 mounted for transverse attachment on the transverse tool bar 11. The digging tools 32 are fixed to the transverse tool bar 11 by clamps 33, the unloosening of which will permit this transverse adjustment of the same along the tool bar.

In rear of the transverse tool bar, there is connected to the longitudinally extending frames 12 and 13 a rotatable shaft 34 adapted for the attachment of roll-over type dammer units 35. This shaft can be removed from the frame by pulling of the cotter pins 36 and 37 from the ends thereof and sliding the same transversely a slight distance to permit the shaft to drop freely of the respective frame members 12 and 13.

Each dammer unit 35 consists of a drag link means 38 which has rigidly connected to its rear end a transversely extending axle portion 39 and has rigidly connected to its forward end spaced portions 40 and 41 carrying sleeves 42 and 43, respectively, for connection to the rotatable shaft 34. These portions 40 and 41 are spaced to permit the mounting of cam means 44 on the shaft. Each cam actuating means 44 includes a sleeve 45 and a radially extending portion having a cam roller 47. The sleeve 45 is of such length as to fit between the spaced portions 40 and 41 of the drag link means, so that, when the sleeve 45 is fixed by a holding screw 46 to the rotatable shaft 34, the dammer unit is held against transverse movement of the rotatable shaft 34. Thus, it should be seen that the positioning of the cam means along the rotatable shaft 34 determines the position of the dammer attachment on the shaft. By unloosening the screw 46 of the cam, the entire dammer attachment and cam can be moved transversely into longitudinal alinement with its digging tool 32 which it is supposed to follow. In other words, the forward portion of the dammer attachment is so fashioned at its point of connection with the shaft and with respect to the cam that its location on the shaft will be determined and retained by the positioning of the cam.

On the transversely extending portion 39 and at its side of the drag link 38, there is mounted for rotation two revolvable blade means indicated generally at 48. Each of the revolvable blade means includes three radially extending blade portions 49 which have their inner ends overlapped and welded to one another to form a box-like structure adapted to fit on the transverse axle portion 39 and having plates 50 secured to the vertical edges of the blade portions 49 to provide journaled portions of the blade means with the transverse axle portion 39. The revolvable blade means also includes vertically extending bracing plates 51 rigidly secured as by welding between adjacent blade portions for bracing the same in locations radially removed from the box-like central structure formed by the inner ends of the blade portions. To remove one of these revolvable blade means 48, it is only necessary to remove a cotter pin 52 in the transverse axle portion 39.

As illustrated more clearly in Figure 3, it should be seen that the damming blade portions 49 follow in a previously formed furrow or trench made by the digging tool 32. This blade portion collects dirt, and means is made to release the revolvable blade means after sufficient dirt has been collected to form a dam in the furrow. This releasing means takes the form of a tripping mechanism 53 carried by the drag link 38, which consists generally of two pivotal levers 54 and 55, the lever 54 adapted to be pivoted with respect to the drag link 38 and the lever 55 adapted to be operated by the cam roller 47 as it is rotated to transmit movement by means of a link 56 to the pivoted lever 54 located near to the revolvable blade means and having at its outer end a roller 57. In rear of the point of connection of the pivoted lever 54 with the drag link 38, there is a stop mechanism 58 and a spring 59 adapted to retain the lever 54 against the stop mechanism. When the lever 54 is on the stop mechanism 58, the revolvable blade means is prevented from revolving by the outer end or the blade portion 49 contacting with the roller 57 of the lever 54. As a means for pivoting the lever 55 at the forward end of the drag link, the spaced portions 40 and 41, respectively, carry vertically and inwardly extending portions 60 and 61, and the lever swings from a pin 62 carried by these portions at their upper ends. It should now be seen that, as the cam roller 47 rotates, it contacts with the lower end of the lever 55 which carries the link 56 and the lever 54 forwardly to release the blade portion 49 from the cam roller 57 on the lever 54.

As soon as the cam roller 57 has been released, the spring 59 will cause the lever 54 to be brought back against the stop 58 readily to receive and prevent rotation of another radially extending blade portion 49. The action of the trip mechanism preferably has to be very fast in order that the roller 57 will be put into position to stop the revolvable means as it has made a one-third revolution.

It should now be noted that the drag link means is pivoted at the same common center about which the cam means 44 rotates. Thus, any vertical movement of the drag link means, due to any uneven ground contour does not change the relationship between the cam 44 and the pivotal lever 55; the pivotal lever 55 being fixed for rotation with the drag link means moves about a common center with the cam roller 47.

As a means tending to retain the revolvable blade means in the furrow formed by the digging tool 32, there is provided a spring-biasing means indicated generally at 63. This biasing means 63 includes a longitudinally extending link member 64 pivotally connected at its rear end to a vertically extending portion 65 rigidly carried by the portion 41 of the drag means 38. The forward portion of the link 64 extends through a bracket member 66 held fixed by means of a clamp to the transverse tool bar 11 and adapted to be laterally adjustable therealong, depending upon the transverse location of the dammer unit on the rotatable shaft 34. Fixed on the link 64 substantially midway between its connection with the arm 65 and the bracket 66 is a collar member 67 adapted to retain a biasing spring 68 against the bracket 66. This biasing spring 68, being put under compression, will tend to push the link 64 rearwardly and thus impart a counter-clockwise movement to the dammer attachment about the rotatable shaft 34. The spring 68 will thereby tend to maintain the dammer attachment in the ground.

In order to fix the lowered position of the dammer attachment relative to the carrying frame 10, there is provided on this link 64 a second collar 69. This collar 69 may be fixed at a location on the link and thereby determine the adjustment of the revolvable means with respect to the frame 10 and its working tool 32. If it is desired to have the revolvable means run deeper than the working tool 32, the adjustable collar 69 is adjusted to a location forwardly on the link 64.

As a means for operating the rotatable shaft 34, there is provided on the supporting means 19 and adapted to be operated by the wheel 21 a sprocket 70 adapted to drive a chain 71 connected to a clutch mechanism indicated generally at 72, through which a chain drive 73 may be driven to rotate the sprocket 74 rigidly fixed to the rotatable shaft 34. While the machine is in operation, there is continuous rotation of the rotatable shaft 34 through this means.

As illustrated in Figure 4, the various cam means 44 spaced along the rotatable shaft for operating its respective dammer unit 35 may be angularly spaced on the rotatable shaft with respect to an adjacent cam means. By so arranging these cam means on the shaft, the trip mechanism of the different attachments may be operated in a sequential manner, thereby tripping one dammer attachment at a time. In other words, the dammer attachments operate in a definite and predetermined sequence.

The clutch mechanism 72 is adapted for the throwout of driving relationship of the wheel 21 with respect to the shaft 34 automatically upon the lifting of the frame 10 with respect to the supporting frame 19 when the power lift mechanism is operated. As a means for accomplishing this, there is provided interfitting clutch portions 75, one of which is adapted to be slidable with respect to the other and normally retained by a clutch spring 76, but adapted to be broken apart by the relative rotation of cam members 77 and 78. The pivoting of the double crank means with respect to the frame causes a link 79 to move rearwardly, as shown more clearly in Figure 3, to rotate the cam member 78 relative to cam member 77. Hence, when the working tools are lifted out of their working position by the power lift means 22, the trip mechanisms 53 are automatically put out of operation since the rotatable shaft will no longer rotate, the break in the driving relationship between the retaining shaft 34 and the wheel 21 being by means of the clutch mechanism just described.

It should now be seen that there has been provided by the present invention a summer fallowing machine in which a single shaft serves as a means for connecting the damming attachments and as a means for giving power for the operation of the trip mechanisms associated with each respective dammer attachment, this connecting means also providing an arrangement wherein the dammer attachments may be adjusted transversely to be placed into transverse alinement with working tools carried by the main carrying frame. The row spacings of the working tools may depend upon the number of working tools being used on the transverse tool bar. Also means has been provided whereby the dammer attachments may be readily removed or added to correspond to the number of working tools being used. It should also be seen that a simple arrangement of the dammer attachment is provided at its point of connection with the frame which is so fashioned that the positioning of the working cams may readily determine and fix the position of the dammer attachments at their point of connection, and to permit rotation of the attachment and cam about a common center. Also, that biasing means is provided which may be readily transversely adjustable along the transverse bar to be operable at any location of the dammer attachment along its point of connection on the rotatable shaft.

While various changes may be made in the detailed construction and in the arrangement of the various parts, it should be understood that certain changes shall be within the spirit and scope of the invention as defined in the appended claims.

What is claimed is:

1. In combination, a frame, ground means for supporting said frame, a rotatable shaft carried by the frame, a roll-over type dammer attachment trailingly and pivotally connected to said shaft for vertical movement including a revolvable blade means and a trip mechanism for releasing the blade means to permit revolving of the same, said trip mechanism having a pivoted lever, and a cam for operating the trip mechanism on said rotatable shaft, whereby said dammer attachment and its trip mechanism pivot about a common center of the shaft and cam to thereby maintain the radial relationship of the pivoted lever of the trip mechanism and cam during vertical movement of the blade means due to uneven contour of the ground.

2. In combination, a wheel supported frame, a rotatable shaft carried by the frame, means for driving said shaft, a drag means pivoted for vertical movement on said shaft, revolvable blade means carried by the drag means, trip mechanism carried by and extending longitudinally of the drag means and including a lever pivoted directly with respect to the drag means, and a cam also on said shaft adapted to operate said trip mechanism, whereby the drag means and trip mechanism rotate about a common center of the shaft and cam to thereby maintain the radial relationship of the pivoted lever of the trip mechanism and the cam during vertical movement of the blade means due to uneven contour of the ground.

3. In combination, a wheel supported frame including a rotatable shaft adapted to serve as draft means, a roll-over type dammer attachment adapted to be pivotally connected to said rotatable shaft to be drawn by the same and including a trip mechanism with a pivoted lever and a cam rotatable with said shaft for operating said pivoted lever.

4. In combination, a wheel supported frame including a rotatable shaft, a cam on said shaft, a roll-over type dammer attachment including a trip mechanism with a pivoted lever attachable as a unit to said shaft, said cam adapted to cooperate with the pivoted lever to operate the same.

5. In combination, a wheel supported frame including a transversely extending rotatable shaft, means for driving said shaft, cams adapted to be fixed at different locations along the shaft, roll-over type dammer attachments each of which includes a trip mechanism and each adapted to be placed at different locations on the shaft spaced relative to each other, and the said cams respectively serving to operate the respective trip mechanism.

6. In combination, a wheel supported frame including a transverse tool bar, ground working tools adapted to be carried at different locations along said tool bar, a transversely extending rotatable shaft carried by the frame in rear of the tool bar, means for driving said rotatable shaft, cams fixed along the shaft in spaced relation with respect to each other, roll-over type dammer attachments, each of which includes a trip mechanism adapted to be operated by a cam and each adapted to be placed at different locations on the shaft spaced relative to each other and in longitudinal alinement with a respective working tool, the same cams respectively serving to operate the respective trip mechanisms.

7. In combination, a wheel supported frame including a transverse tool bar, ground working tools adapted to be carried at different locations along said tool bar, a transversely extending rotatable shaft carried by the frame in rear of the tool bar, means for driving said rotatable shaft, cams fixed along the shaft in spaced relation with respect to each other, roll-over type dammer attachments, each of which includes a trip mechanism adapted to be operated by a cam and each adapted to be placed at different locations on the shaft spaced relative to each other and in longitudinal alinement with a respective working tool, and each of said attachments being so fashioned at its point of connection with the shaft and with respect to the cam that its location on the shaft will be determined and retained by the positioning of its respective cam.

8. In combination, a wheel supported frame including a transversely extending rotatable shaft, means for driving said shaft, a cam adapted to be fixed at different locations along the shaft, a dammer attachment likewise adapted to be located at different locations along the shaft and to be operated by said cam, and said attachment being so fashioned at its point of connection with the shaft and with respect to the cam on the shaft that its location will be determined and retained by the positioning of the cam.

9. In combination, a wheel supported frame including a transversely extending rotatable shaft, means for driving said shaft, cams adapted to be fixed along the shaft in spaced relation with respect to each other, roll-over type dammer attachments each of which includes a trip mechanism adapted to be operated by a cam and adapted to be located at different locations along the shaft and each of the attachments being so fashioned at its point of connection with the shaft and with respect to the cam that its location on the shaft will be determined and retained by the positioning of the cam.

10. In combination, a frame including a transversely extending rotatable shaft, a roll-over type dammer attachment adapted to be pivoted on the shaft and including a trip mechanism, a cam for operating the trip mechanism adjustably fixed to said rotatable shaft, and said attachment also including spaced portions at its point of connection with the shaft, one at each side of the cam, whereby the attachment will be held by the cam in a laterally adjusted position along the shaft.

11. In combination, a frame including a transversely extending rotatable shaft, a roll-over type dammer attachment adapted to be pivoted on said shaft for vertical movement, and including a trip mechanism, a cam for operating the trip mechanism fixed to said rotatable shaft, said attachment including spaced portions at its point of connection with the shaft, one at each side of the cam, and said trip mechanism having a pivotal member carried by the spaced portions and adapted to be engaged by said cam member.

12. In combination, a wheel supported frame including a transversely extending rotatable shaft, means for driving said shaft, a plurality of roll-over type dammer attachments pivotally connected to the shaft for vertical movement and in spaced relation with respect to each other therealong, each dammer attachment including a trip mechanism, a plurality of cams on said shaft and in spaced and angularly staggered relation with respect to each other, the said cams respectively thereby serving to operate the respective trip mechanisms in a sequential manner upon rotation of said shaft.

13. In combination, a wheel supported frame including a transversely extending shaft, a dammer attachment pivotally connected to said shaft and adapted to be located at different locations along the same, biasing means coacting with said attachment to maintain the same in its ground-working position, and means for fixing the biasing means at different locations transversely of the frame corresponding respectively to the different locations of the dammer attachment along the shaft.

14. In combination, a wheel supported frame including a transversely extending shaft and a transverse tool bar, a dammer attachment pivotally connected to said shaft and adapted to be located at different locations along the same, biasing means coacting with said attachment to maintain the same in its ground-working position, and means for adjustably fixing the biasing means to the tool bar at different locations therealong corresponding respectively to the different locations of the dammer attachment along the shaft.

15. In a roll-over type dammer, a drag means having a transversely extending axle portion, revolvable blade means including a plurality of blades with the inner ends of the respective blades overlapping each other and arranged to form a box-like structure to fit on said transverse axle portion, and means secured to the blades to provide journal portions for the blade means with the axle portion.

16. In a roll-over type dammer, a drag means having a transversely extending axle portion, a revolvable blade means including a plurality of blade portions with inner ends arranged to form a box-like structure to fit on said transverse axle portion, and vertically extending bracing plates extending between the adjacent blade portions for bracing the means in locations radially removed from the box-like structure.

17. In a roll-over type dammer, a drag means having a transversely extending axle portion, a revolvable blade means including a plurality of blade portions with their inner ends arranged to form a box-like structure and having vertical edges, and plates secured to the vertical edges of said blade portions to provide journal portions of the blade means with the axle portion.

JAMES L. HIPPLE.